Feb. 18, 1941.   P. W. KLIPSCH   2,232,613
SEISMIC PROSPECTING
Original Filed May 1, 1937

PAUL W. KLIPSCH
INVENTOR.

BY   Lester B. Clark.
ATTORNEY.

Patented Feb. 18, 1941

2,232,613

UNITED STATES PATENT OFFICE 2,232,613

SEISMIC PROSPECTING

Paul W. Klipsch, Houston, Tex., assignor of fifty percent to E. E. Rosaire, Houston, Tex.

Original application May 1, 1937, Serial No. 140,090. Divided and this application October 1, 1940, Serial No. 359,189

6 Claims. (Cl. 181—0.5)

This invention relates to geophysical exploration by seismography and specifically to the use of multiple shot points. The application is a division of my copending application Serial Number 140,090 filed May 1, 1937 for Recording seismic waves.

An object of the invention is to increase the ratio of signal to noise, where, by way of definition, signal means that part of a recorded disturbance which can be interpreted in terms of geological structure, and noise means other parts of the recording which cannot be so interpreted. Ordinarily, the signal is a reflected wave and the noise is a summation of waves arriving by paths other than reflection.

Another object of the invention is the reduction of noises arising from the seismic disturbance, which, while regular as to cause, frequently exhibit such irregular effects that they are amenable to reduction along with irregular noise.

Another and more specific object of the invention is to provide a method of exploring geological formations by creating a plurality of centers of seismic disturbances arranged at an optimum array length whereby the refracted waves and waves of seismic unrest are minimized while the reflected waves are additive whereby a large signal to noise ratio is obtained.

The foregoing objects are primary and will, together with other objects and advantages of the invention, be apparent from the following description considered in connection with the accompanying drawing in which.

Figure 1:
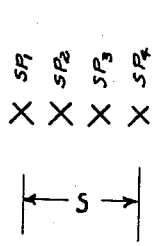
Fig. 1 shows a plan view of an array of shot points together with points of detection.
Figure 1:
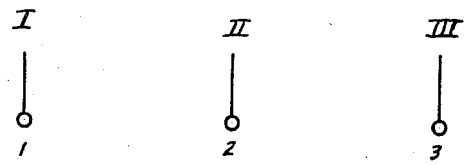

In the figures the points of generation of the seismic waves are indicated $SP_1$, $SP_2$, etc. The points of detection are indicated 1, 2, 3, etc. The array length of an array of shot points is designated in Fig. 1 as S and in Fig. 2 as $S_1$. From 4 to 12 recording channels are commonly used but the drawing shows by way of illustration only 3 such channels which are designated I, II, III.

In accordance with the invention, whereby the optimum ratio of reflected to surface wave amplitude is obtained, the array length S of the shot points $SP_1$ to $SP_4$ must be of the same order of magnitude as the array length of points of detection would be if multiple points of detection and a single shot point were used.

Figure 2:
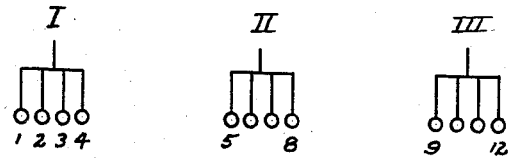
Fig. 2 shows a plan view of an array of shot points together with array of points of detection.

In Fig. 2 the array length of the detection points in each channel are shown as $S_2$. The sum of the array lengths $S = S_1 + S_2$ would be the optimum figure to be determined and used such that the value S lies between maximum and minimum values according to Equations 1 and 2 hereinafter. The derivation of these equations is set forth in detail in the application of which this is a division and it is deemed unnecessary that such derivation be detailed herein.

Thus:

$$S_{max} = \frac{V}{\sin \phi} \cdot \frac{1}{4F} \quad \text{-----------(1)}$$

$$S_{min} = \frac{v}{2f} \quad \text{-----------(2)}$$

wherein
$S_{max}$ = maximum permissible array length
$S_{min}$ = minimum permissible array length
$V$ = minimum longitudinal seismic velocity of the reflected waves
$v$ = maximum longitudinal seismic velocity of the refracted noises to be reduced
$F$ = maximum frequency to be recorded
$f$ = frequency minimum to be recorded
$\phi$ = maximum emergence angle of reflected waves measured from the vertical Obviously the points of disturbance should be created nearly simultaneously; that is all the shots in the array should be fired with a total time delay which is not materially greater than the delay which would be caused by an array length equal to S.

If a delay between shots is permitted it would of course be preferable to have the shots fired progressively in the direction which would produce the least asynchronism at the point of detection.

It seems apparent from a consideration of Equations 1 and 2 above that the terms $S_{max}$ and $S_{min}$ are respectively one-fourth and one-half the apparent surface wave lengths of the reflected and refracted waves.

While a specific method has been disclosed in the foregoing description it is not intended that the present invention shall be confined thereto since such invention broadly comprehends such orientation and array lengths when utilizing a plurality of centers of seismic disturbances that the recording interpreted in terms of geophysical structures provides a maximum of information relative to such structure.

What is claimed is:

1. The method of exploring geological formations which comprises creating a plurality of spaced centers of disturbance in the earth's crust, said points being horizontally spaced to form a disturbance array length $S_1$, receiving the seismic waves at detector points arranged in a plurality of spaced groups of several points each, said points within each group being spaced in the earth's crust to form an array length $S_2$ which added to the disturbance array length possesses a value $S=S_1+S_2$ intermediate maximum and minimum values expressed by the equations:

$$S_{max}=\frac{V}{\sin \phi}\cdot\frac{1}{4F}$$

$$S_{min}=\frac{v}{2f}$$

wherein $S_{max}$ = maximum permissible array length
$S_{min}$ = minimum permissible wave length
$V$ = minimum longitudinal seismic velocity of the reflected waves
$v$ = maximum longitudinal seismic velocity of the refracted noises to be reduced
$F$ = maximum frequency to be recorded
$f$ = frequency minimum to be recorded
$\phi$ = maximum emergence angle of reflected waves measured from the vertical, and simultaneously recording for each detection array the algebraic sum of the impulses received at the points within such array.

2. The method of exploring geological formations comprising creating substantially simultaneously a plurality of centers of disturbance in the earth's crust, receiving the seismic waves at a plurality of detector points, said centers of disturbance being spaced horizontally in the earth's crust to form an array length intermediate the maximum and minimum values expressed by the equations:

$$S_{max}=\frac{V}{\sin \phi}\cdot\frac{1}{4F}$$

$$S_{min}=\frac{v}{2f}$$

wherein $S_{max}$ = maximum permissible array length
$S_{min}$ = minimum permissible wave length
$V$ = minimum longitudinal seismic velocity of the reflected waves
$v$ = maximum longitudinal seismic velocity of the refracted noises to be reduced
$F$ = maximum frequency to be recorded
$f$ = frequency minimum to be recorded
$\phi$ = maximum emergence angle of reflected waves measured from the vertical, and simultaneously recording for each point of detection the algebraic sum of the impulses from all the centers of disturbance received at such point.

3. The method of exploring geological formations which comprises, creating a plurality of centers of seismic disturbance in the crust of the earth, receiving the seismic waves at detector points horizontally spaced in the crust of the earth, spacing the centers of disturbance to form an array length determined from the minimum surface velocity of reflected waves and the maximum surface velocity of noise waves until the length is less than a maximum value equal to one-fourth of the apparent surface wave length of the reflected wave and is greater than a minimum value equal to one-half wave length of the surface noise waves and recording the algebraic sum of the impulses received at all the points in the group.

4. The method of exploring geological formations which comprises, creating a plurality of centers of seismic disturbance in the crust of the earth, receiving the seismic waves at a group of horizontally spaced detector points, spacing the centers of disturbance and spacing the points of detection within the group to form respective array lengths the sum of which is less than one-fourth of the apparent surface wave length of the reflected wave length and is greater than one-half of the wave length of the surface noise waves and recording the algebraic sum of the waves received at the group of detector points.

5. The method of exploring geological formations which comprises, creating simultaneously a plurality of centers of seismic disturbance in the crust of the earth, receiving the seismic waves at a group of horizontally spaced detector points, spacing the centers of disturbance and spacing the points of detection within the group to form respective array lengths the sum of which is less than one-fourth of the apparent surface wave length of the reflected wave length and is greater than one-half of the wave length of the surface noise waves and recording the algebraic sum of the waves received at the group of detector points.

6. The method of exploring geological formations which comprises, creating a plurality of centers of seismic disturbance in the crust of the earth, receiving the seismic waves at a plurality of groups of horizontally spaced detector points, spacing the centers of disturbance and spacing the points of detection within each group to form arrays such that the sum of the shot-points array plus any given detector array length is less than one-fourth of the apparent surface wave length of the reflected wave length and is greater than one-half of the wave length of the surface noise waves and recording the algebraic sum of the waves received at the group of detector points.

PAUL W. KLIPSCH.